United States Patent
Sunaga et al.

(10) Patent No.: US 9,931,686 B2
(45) Date of Patent: Apr. 3, 2018

(54) PROTECTIVE COVER FOR VIBRATING COMPACTOR AND MANUFACTURING METHOD THEREOF

(71) Applicant: MIKASA SANGYO CO., LTD., Chiyoda-ku, Tokyo (JP)

(72) Inventors: Hisaharu Sunaga, Shiraoka (JP); Hideki Mochiki, Hasuda (JP); Kenichi Nagasawa, Hasuda (JP); Kenichi Muramoto, Chofu (JP); Yoshinori Miura, Shiraoka (JP); Yoshio Iguchi, Shiraoka (JP)

(73) Assignee: MIKASA SANGYO CO., LTD., Tokyo (JP)

( * ) Notice: Subject to any disclaimer, the term of this patent is extended or adjusted under 35 U.S.C. 154(b) by 208 days.

(21) Appl. No.: 14/113,186

(22) PCT Filed: Mar. 25, 2013

(86) PCT No.: PCT/JP2013/058580
§ 371 (c)(1),
(2) Date: Oct. 21, 2013

(87) PCT Pub. No.: WO2014/155492
PCT Pub. Date: Oct. 2, 2014

(65) Prior Publication Data
US 2014/0283645 A1 Sep. 25, 2014

(51) Int. Cl.
*F02B 77/00* (2006.01)
*B21D 53/80* (2006.01)
(Continued)

(52) U.S. Cl.
CPC .............. *B21D 53/80* (2013.01); *B23P 15/00* (2013.01); *F16P 1/02* (2013.01); *Y10T 74/219* (2015.01)

(58) Field of Classification Search
USPC ............................................. 72/324; 74/608
See application file for complete search history.

(56) References Cited

U.S. PATENT DOCUMENTS

| 5,121,810 A | 6/1992 | Araki | |
| 5,274,200 A * | 12/1993 | Das | E04B 1/8218 181/202 |
| 2012/0202669 A1* | 8/2012 | Hannum | B31B 1/26 493/405 |

FOREIGN PATENT DOCUMENTS

| JP | 58-83596 U | 6/1983 |
| JP | 05-89707 A | 4/1993 |

(Continued)

OTHER PUBLICATIONS

Chinese Office Action (and machine English translation thereof) dated Jul. 23, 2015, issued in counterpart Chinese Application No. 201380000386.X.

(Continued)

*Primary Examiner* — Lindsay Low
*Assistant Examiner* — Ruben Picon-Feliciano
(74) *Attorney, Agent, or Firm* — Holtz, Holtz & Volek PC

(57) ABSTRACT

A box-shaped protective cover that covers an upper structural portion of a body of a vibrating compactor is manufactured by executing a cutting process for fashioning a single metal plate into a shape including a first planar portion, a second planar portion, an intermediate portion, and a plurality of side flaps, a bending process for bending or curving the side flaps and the intermediate portion, and a welding process for welding a side flap of the first planar portion to a side flap of the second planar portion.

9 Claims, 3 Drawing Sheets

(51) Int. Cl.
*F16P 1/02* (2006.01)
*B23P 15/00* (2006.01)

(56) References Cited

FOREIGN PATENT DOCUMENTS

| JP | 10-140518 A | 5/1998 |
|----|-------------|--------|
| JP | 10-266116 A | 10/1998 |

OTHER PUBLICATIONS

International Search Report (ISR) issued in International Application No. PCT/JP2013/058580.

* cited by examiner

PROTECTIVE COVER FOR VIBRATING COMPACTOR AND MANUFACTURING METHOD THEREOF

TECHNICAL FIELD

The present invention relates to a protective cover for a vibrating compactor, which is mounted on a machine body to protect an engine or another element installed in the vibrating compactor, and a method of manufacturing the protective cover.

BACKGROUND ART

A metal guard member (a protective cover) is typically attached to a vibrating compactor to protect an engine or another element. Known examples of this type of protective cover include a combination of a metal pipe bent in accordance with a shape of an upper structural portion of a machine body and a metal plate, and a component formed in a box shape that can cover the top, sides, and front (or rear) of the upper structural portion of the machine body by welding together a plurality of metal plates or implementing pressing on a single metal plate.
Patent Document 1: JP H10-140518 A
Patent Document 2: JP H10-266116 A

SUMMARY OF INVENTION

Technical Problem

However, the protective cover formed by combining a metal pipe and a metal plate requires a pipe bending process, a plate cutting process, and a process for attaching the plate to the bent pipe, and therefore manufacture is laborious. Further, when the box-shaped protective cover is manufactured by welding together the plurality of metal plates, a total extension of sides of the plates joined by the welding is extremely long, and therefore manufacture is not only laborious but also expensive. Moreover, when the box-shaped protective cover is manufactured by pressing, an increase in manufacturing cost occurs due to the need to manufacture press molds and so on.

The present invention has been designed to solve these problems in the related art, and an object thereof is to provide a method of manufacturing a sufficiently strong box-shaped protective cover for a vibrating compactor inexpensively using a small number of processes and only simple processes, and to provide a protective cover for a vibrating compactor.

Solution to Problem

A method according to the present invention is a method of manufacturing a box-shaped protective cover that covers an upper structural portion of a body of a vibrating compactor by executing a cutting process for fashioning a single metal plate into a shape including a first planar portion, a second planar portion, an intermediate portion, and a plurality of side flaps, a bending process for bending or curving the side flaps and the intermediate portion, and a welding process for welding a side flap of the first planar portion to a side flap of the second planar portion, wherein, in the cutting process, the single metal plate is fashioned so that the intermediate portion is disposed between the first planar portion and the second planar portion, whereby the first planar portion, the intermediate portion, and the second planar portion are arranged in a single direction, the side flaps respectively project sideward (in an orthogonal direction to an arrangement direction of the first planar portion, the intermediate portion, and the second planar portion) from the first planar portion and the second planar portion, and a joint end edge formed in a position close to the intermediate portion on the side flap of the first planar portion opposes a joint end edge formed in a position close to the intermediate portion on the side flap of the second planar portion via a predetermined gap, in the bending process, first, the side flaps are bent or curved to one side, whereupon either the intermediate portion is curved about a virtual axis line that is orthogonal to the arrangement direction of the first planar portion, the intermediate portion, and the second planar portion or the first planar portion, the intermediate portion, and/or the second planar portion are bent along a bend line that is orthogonal to the arrangement direction of the first planar portion, the intermediate portion, and the second planar portion such that the joint end edge of the side flap of the first planar portion abuts the joint end edge of the side flap of the second planar portion, and in the welding process, the abutting joint end edges of the respective side flaps of the first planar portion and the second planar portion are welded.

On the metal plate fashioned in the cutting process, a sum of an angle ($\theta 1$), between the joint end edge of the side flap of the first planar portion and the opposing joint end edge of the side flap of the second planar portion, and an inner angle ($\theta 2$), between the first planar portion and the second planar portion of a finally manufactured protective cover, is preferably set at an angle of 180°. The joint end edge of the side flap of the first planar portion and the joint end edge of the side flap of the second planar portion may be welded while overlapping each other.

A protective cover for a vibrating compactor according to the present invention is formed by partially bending or curving a single metal plate fashioned into a shape including a first planar portion, a second planar portion, an intermediate portion, and a plurality of side flaps, wherein, the single metal plate is fashioned so that the intermediate portion is disposed between the first planar portion and the second planar portion, whereby the first planar portion, the intermediate portion, and the second planar portion are arranged in a single direction, the side flaps respectively project sideward from the first planar portion and the second planar portion, and a joint end edge formed in a position close to the intermediate portion on the side flap of the first planar portion opposes a joint end edge formed in a position close to the intermediate portion on the side flap of the second planar portion via a predetermined gap, the side flaps are bent or curved to one side, either the intermediate portion is curved about a virtual axis line that is orthogonal to an arrangement direction of the first planar portion, the intermediate portion, and the second planar portion or the first planar portion, the intermediate portion, and/or the second planar portion are bent along a bend line that is orthogonal to the arrangement direction of the first planar portion, the intermediate portion, and the second planar portion, and the joint end edge of the side flap of the first planar portion and the joint end edge of the side flap of the second planar portion are welded while abutting each other. The joint end edge of the side flap of the first planar portion and the joint end edge of the side flap of the second planar portion may be welded while overlapping each other.

Advantageous Effects of Invention

With the method according to the present invention, a sufficiently strong, box-shaped protective cover for a vibrating compactor can be manufactured inexpensively using a small number of processes and only simple processes. More specifically, in contrast to the related art, there is no need to execute a troublesome and laborious process for attaching a plate to a bent pipe and no need to manufacture a press molds such as that required to perform pressing. Moreover, the total extension of the sides of the plate subjected to welding can be minimized, and as a result, the protective cover can be manufactured inexpensively using a small number of processes and only simple processes.

DESCRIPTION OF EMBODIMENTS

In a method of manufacturing a protective cover according to the present invention, a box-shaped protective cover for covering an upper structural portion of a body of a vibrating compactor is manufactured by executing a cutting process for fashioning a single metal plate into a predetermined shape (a shape including a first planar portion, a second planar portion, an intermediate portion, and a plurality of side flaps), a bending process for bending or curving the side flaps and the intermediate portion, and a welding process for welding a side flap of the first planar portion to a side flap of the second planar portion. Each of these processes will be described below.

1. Cutting Process

Figure 1:
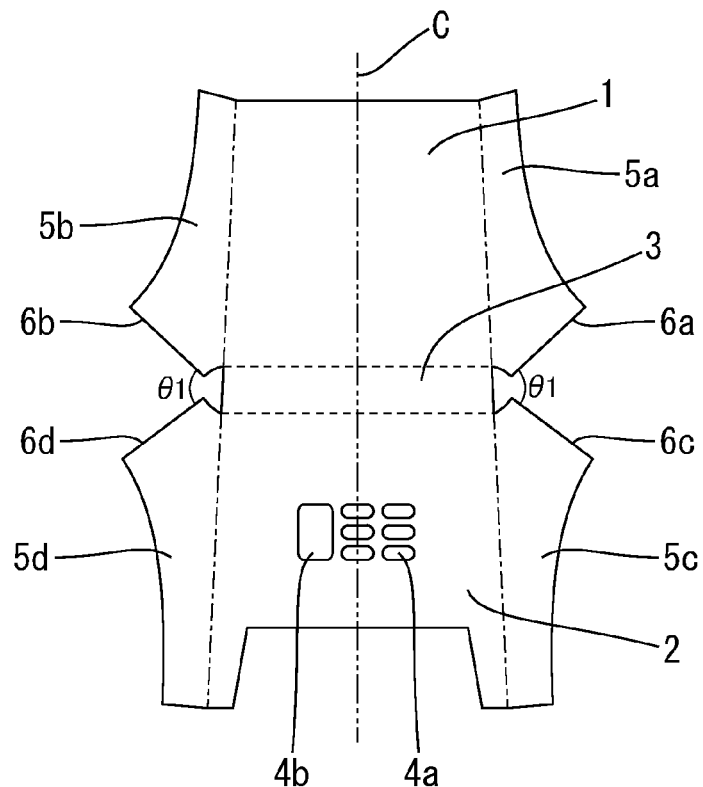
FIG. 1 is an illustrative view showing a cutting process of a protective cover manufacturing method according to the present invention.

First, as shown in FIG. 1, a single metal plate serving as a raw material of the protective cover is fashioned into a contour shape exhibiting left-right symmetry about a center line C and including a first planar portion 1, a second planar portion 2, an intermediate portion 3, and four side flaps 5 (first to fourth side flaps 5a to 5d).

Of these parts, the first planar portion 1 is a part constituting a ceiling surface of the protective cover (a finished product), and in an embodiment shown in FIG. 1, the first planar portion 1 is formed in a trapezoidal shape. The second planar portion 2 is a part constituting a front side face of the protective cover, and in the embodiment shown in FIG. 1, the second planar portion 2 takes a basic trapezoidal shape from which a lower bottom side is partially cut away and in a center of which an air vent 4a and an operating window 4b are formed. The intermediate portion 3, which has a horizontal trapezoidal shape, is disposed between the first planar portion 1 and the second planar portion 2 such that the first planar portion 1, the intermediate portion 3, and the second planar portion 2 are arranged in a single direction (a direction of the center line C).

The first side flap 5a and the second side flap 5b are formed respectively on left and right sides of the first planar portion 1 (in an orthogonal direction to an arrangement direction of the first planar portion 1, the intermediate portion 3, and the second planar portion 2) so as to project outward. Further, the third side flap 5c and the fourth side flap 5d are formed respectively on left and right sides of the second planar portion 2 so as to project outward. No side flaps are formed on left and right sides of the intermediate portion 3.

Joint end edges 6a to 6d are formed respectively on the first to fourth side flaps 5a to 5d. The joint end edges 6a to 6d are all formed in positions close to the intermediate portion 3, and are all formed at an identical length so as to extend at an incline having a predetermined angle relative to the center line C.

The joint end edge 6a of the first side flap 5a opposes the joint end edge 6c of the third side flap 5c, which is adjacent to the first side flap 5a on an extension direction side of the center line C, via a predetermined gap. An angle θ1 between the opposing joint end edges 6a and 6c is set such that in relation to an inner angle θ2 between the first planar portion 1 and the second planar portion 2 of the finally manufactured protective cover, a formula of "θ1+θ2=180°" is established.

Similarly, the joint end edge 6b of the second side flap 5b opposes the joint end edge 6d of the fourth side flap 5d, which is adjacent to the second side flap 5b on the extension direction side of the center line C, via a predetermined gap. The angle θ1 between the opposing joint end edges 6b and 6d is likewise set such that in relation to the inner angle θ2 between the first planar portion 1 and the second planar portion 2 of the finally manufactured protective cover, a formula of "θ1+θ2=180°" is established.

2. Bending Process

Figure 2:
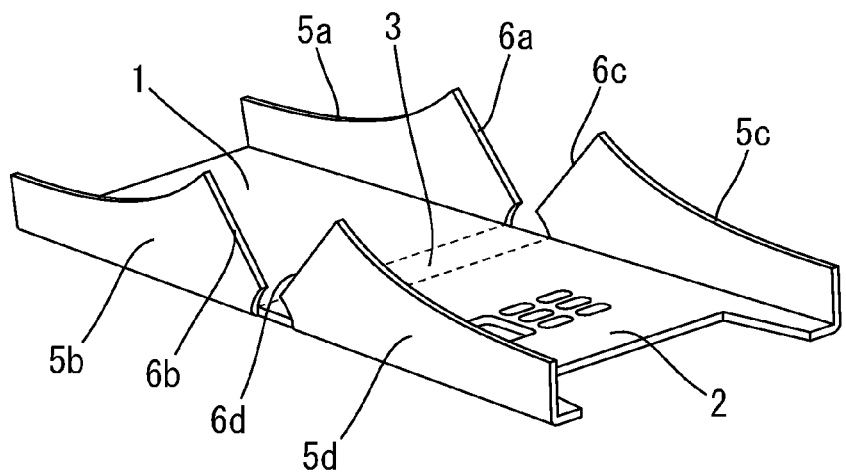
FIG. 2 is an illustrative view showing a bending process of the protective cover manufacturing method according to the present invention.
Figure 3:
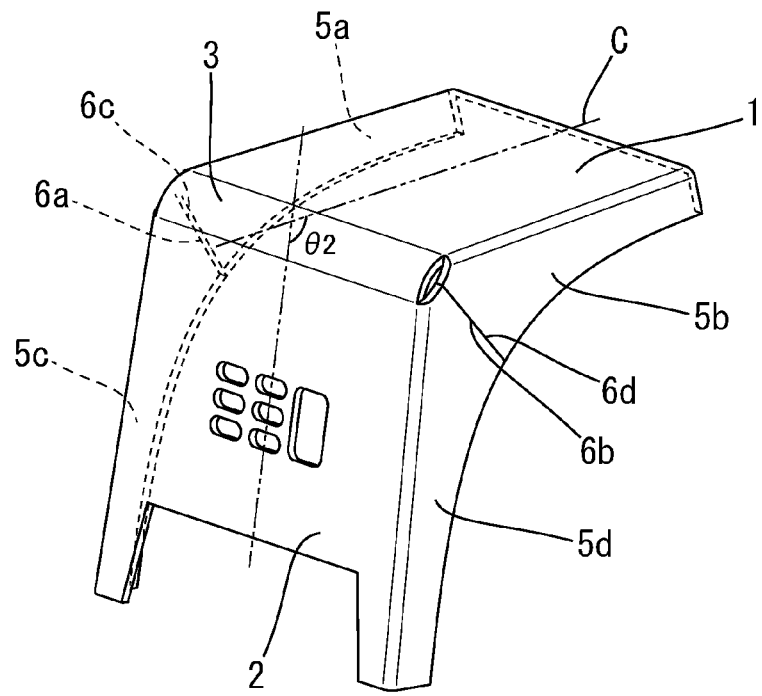
FIG. 3 is an illustrative view showing the bending process and a welding process of the protective cover manufacturing method according to the present invention.

On the metal plate shown in FIG. 1, the first to fourth side flaps 5a to 5d are bent to a right angle (or curved) on one side using boundary lines (dot-dash lines in FIG. 1) with the first planar portion 1 or the second planar portion 2 as bend lines, whereby a condition shown in FIG. 2 is obtained. Next, the intermediate portion 3 is curved using a virtual axis line that is orthogonal to the arrangement direction of the first planar portion 1, the intermediate portion 3, and the second planar portion 2 as a center of curvature such that, as shown in FIG. 3, the inner angle between the first planar portion 1 and the second planar portion 2 becomes θ2, whereby the joint end edges 6a, 6c abut each other and the joint end edges 6b, 6d abut each other.

3. Welding Process

The abutting joint end edges 6a, 6c are then welded, whereupon the abutting joint end edges 6b, 6d are welded.

By executing the respective processes described above, a sufficiently strong, box-shaped protective cover for a vibrating compactor can be manufactured inexpensively using a small number of processes and only simple processes.

In the embodiment shown in FIG. 1, the first planar portion 1, the second planar portion 2, and the intermediate portion 3 are all formed basically in a trapezoidal shape. However, the present invention is not necessarily limited to this shape, and a rectangular shape or another shape may be employed instead.

In the above embodiment, as shown in FIG. 3, the intermediate portion 3 is curved using the virtual axis line that is orthogonal to the arrangement direction of the first planar portion 1 and so on as the center of curvature. Instead, however, a polygonal shape such as that shown in FIG. 4 may be obtained by bending the first planar portion 1 and the second planar portion 2 relative to the intermediate portion 3 along bend lines (a boundary line between the first planar portion 1 and the intermediate portion 3, and a boundary line between the second planar portion 2 and the intermediate portion 3, for example, as shown by dotted lines in FIG. 1) that is orthogonal to the arrangement direction of the first planar portion 1 and so on, or a condition such as that shown in FIG. 5 may be obtained by bending the intermediate portion 3 only once along a bend line that is orthogonal to the arrangement direction of the first planar portion 1 and so on.

Figure 4:
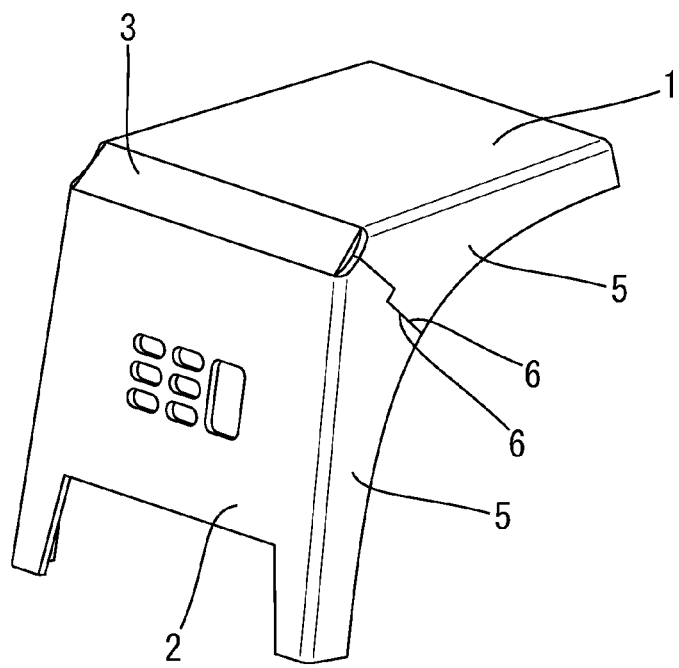
FIG. 4 is a view showing another example of a configuration of a protective cover according to the present invention.

Furthermore, in the embodiment shown in FIGS. 1 to 3, the joint end edges 6a to 6d are all formed in a rectilinear shape, but the joint end edges 6a to 6d do not necessarily have to be formed in a rectilinear shape, and instead, the joint end edges 6a to 6d may be curved or, as shown in FIG. 4, formed in a crank shape having a stepwise portion.

Figure 5:
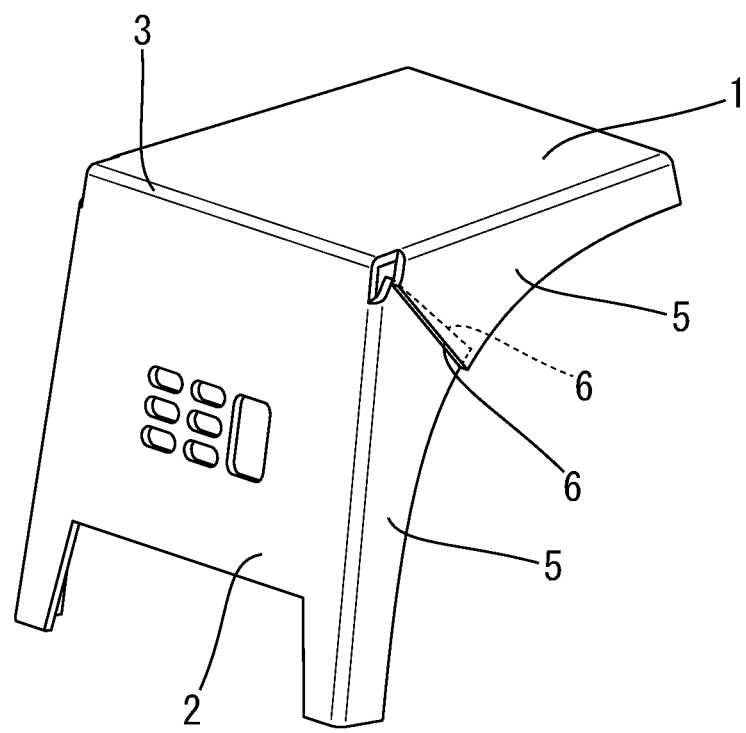
FIG. 5 is a view showing a further example of the configuration of the protective cover according to the present invention.

Moreover, in the embodiment described above, the opposing joint end edges 6a to 6d are welded while abutting each other, but instead, as shown in FIG. 5, the joint end edges 6 may be welded while overlapping by a predetermined width.

Furthermore, in the present invention, the first planar portion 1 and the second planar portion 2 include not only components formed entirely from perfect planes, but also partially irregular components, components having a curved surface, components in which a hole or a groove is formed, and so on.

The present invention provides a method of manufacturing a sufficiently strong, box-shaped protective cover for a vibrating compactor inexpensively using a small number of processes and only simple processes, and provides a protective cover for a vibrating compactor.

The invention claimed is:

1. A vibrating compactor protective cover manufacturing method for manufacturing a box-shaped protective cover that covers an upper structural portion of a body of a vibrating compactor, said method comprising:
    a cutting process for forming a single metal plate into a shape including a first planar portion, a second planar portion, an intermediate portion, and a plurality of side flaps,
    a bending process for bending or curving the side flaps and the intermediate portion, and
    a welding process for welding a side flap of the first planar portion to a side flap of the second planar portion,
    wherein, in the cutting process, the single metal plate is fashioned so that the intermediate portion is disposed between the first planar portion and the second planar portion, whereby the first planar portion, the intermediate portion, and the second planar portion are arranged in a single direction, the side flaps respectively project sideward from the first planar portion and the second planar portion, and a joint end edge of the side flap of the first planar portion formed in a position adjacent to the intermediate portion opposes a joint end edge of the side flap of the second planar portion formed in a position adjacent to the intermediate portion via a predetermined gap, said joint end edges of the side flaps being inclined at an oblique angle relative to an arrangement direction of the first planar portion, the intermediate portion and the second planar portion, and said joint end edges of the side flaps opposing each other via the predetermined gap along the arrangement direction;
    wherein, in the bending process, first, the side flaps are bent or curved to one side, whereupon one of: (i) the intermediate portion is curved about an axis line that is orthogonal to the arrangement direction of the first planar portion, the intermediate portion, and the second planar portion, and (ii) at least one of the first planar portion, the intermediate portion and the second planar portion are bent along a bend line that is orthogonal to the arrangement direction of the first planar portion, the intermediate portion, and the second planar portion such that the joint end edge of the side flap of the first planar portion abuts the joint end edge of the side flap of the second planar portion; and
    wherein, in the welding process, the abutting joint end edges of the respective side flaps of the first planar portion and the second planar portion are welded.

2. The vibrating compactor protective cover manufacturing method according to claim 1, wherein on the metal plate fashioned in the cutting process, a sum of an angle, between the joint end edge of the side flap of the first planar portion and the opposing joint end edge of the side flap of the second planar portion, and an inner angle, between the first planar portion and the second planar portion of a finally manufactured protective cover, is set at 180°.

3. A vibrating compactor protective cover manufacturing method for manufacturing a box-shaped protective cover that covers an upper structural portion of a body of a vibrating compactor, said method comprising:
    a cutting process for forming a single metal plate into a shape including a first planar portion, a second planar portion, an intermediate portion, and a plurality of side flaps,
    a bending process for bending or curving the side flaps and the intermediate portion, and
    a welding process for welding a side flap of the first planar portion to a side flap of the second planar portion,
    wherein, in the cutting process, the single metal plate is fashioned so that the intermediate portion is disposed between the first planar portion and the second planar portion, whereby the first planar portion, the intermediate portion, and the second planar portion are arranged in a single direction, the side flaps respectively project sideward from the first planar portion and the second planar portion, and a joint end edge of the side flap of the first planar portion formed in a position adjacent to the intermediate portion opposes a joint end edge of the side flap of the second planar portion formed in a position adjacent to the intermediate portion via a predetermined gap, said joint end edges of the side flaps being inclined at an oblique angle relative to an arrangement direction of the first planar portion, the intermediate portion and the second planar portion, and said joint end edges of the side flaps opposing each other via the predetermined gap along the arrangement direction;
    wherein, in the bending process, first, the side flaps are bent or curved to one side, whereupon one of: (i) the intermediate portion is curved about an axis line that is orthogonal to the arrangement direction of the first planar portion, the intermediate portion, and the second planar portion, and (ii) at least one of the first planar portion, the intermediate portion and the second planar portion are bent along a bend line that is orthogonal to the arrangement direction of the first planar portion, the intermediate portion, and the second planar portion such that the joint end edge of the side flap of the first planar portion overlaps the joint end edge of the side flap of the second planar portion; and
    wherein, in the welding process, the overlapped joint end edges of the respective side flaps of the first planar portion and the second planar portion are welded.

4. The vibrating compactor protective cover manufacturing method according to claim 1, wherein the single metal plate is fashioned such that no side flaps are provided on the intermediate portion.

5. The vibrating compactor protective cover manufacturing method according to claim 3, wherein the single metal plate is fashioned such that no side flaps are provided on the intermediate portion.

6. The vibrating compactor protective cover manufacturing method according to claim 1, wherein the single metal plate is fashioned such that:
the side flap of the first planar portion projects sideward from the first planar portion in a direction orthogonal to the arrangement direction of the first planar portion, the intermediate portion and the second planar portion; and
the side flap of the second planar portion projects sideward from the second planar portion in a direction orthogonal to the arrangement direction of the first planar portion, the intermediate portion and the second planar portion.

7. The vibrating compactor protective cover manufacturing method according to claim 3, wherein the single metal plate is fashioned such that:
the side flap of the first planar portion projects sideward from the first planar portion in a direction orthogonal to the arrangement direction of the first planar portion, the intermediate portion and the second planar portion; and
the side flap of the second planar portion projects sideward from the second planar portion in a direction orthogonal to the arrangement direction of the first planar portion, the intermediate portion and the second planar portion.

8. The vibrating compactor protective cover manufacturing method according to claim 1, wherein:
each of the joint end edges of the side flaps has a first end and a second end, the first ends of the joint end edges being at sides of the joint end edges adjacent to the intermediate portion; and
a length of the predetermined gap in the arrangement direction is larger between the second ends of the side flaps than between the first ends of the side flaps.

9. The vibrating compactor protective cover manufacturing method according to claim 3, wherein:
each of the joint end edges of the side flaps has a first end and a second end, the first ends of the joint end edges being at sides of the joint end edges adjacent to the intermediate portion; and
a length of the predetermined gap in the arrangement direction is larger between the second ends of the side flaps than between the first ends of the side flaps.

\* \* \* \* \*